Patented July 4, 1950

2,513,652

UNITED STATES PATENT OFFICE 2,513,652

METHOD FOR THE PRODUCTION OF VISCOSE SOLUTIONS

Emil Kline, Cleveland Heights, Ohio, assignor to Industrial Rayon Corporation, Cleveland, Ohio, a corporation of Delaware No Drawing. Application July 18, 1946,
Serial No. 684,536

6 Claims. (Cl. 260—217)

This invention relates to the production of viscose and, particularly, to the steps of xanthating alkali cellulose and dissolving the cellulose xanthate. More particularly, it is concerned with methods for improving the quality, purity and filterability of viscose and also with reducing the operational cost and time involved in these steps.

In the manufacture of viscose, cellulose in the form of wood pulp sheets, cotton linters, etc., is commonly steeped in an aqueous caustic soda solution of 18–19% concentration at controlled temperatures for about one hour. The alkali cellulose thus formed is pressed to remove excess aqueous caustic solution. After shredding, the pressed alkali cellulose into crumbs, the material is aged under controlled conditions and subsequently converted into cellulose xanthate by treatment in a closed chamber with carbon disulfide. To produce the final viscose spinning solution, the xanthated alkali cellulose crumbs are dissolved in aqueous caustic soda solution. The normal causticity of viscose solutions so produced is between 5% and 8%, by weight.

In the xanthation method employed most generally, a batch of alkali cellulose crumbs having preferably a caustic soda content of about 15%, by weight, is charged into a drum or a so-called "dry churn" adapted to agitate and churn the crumbs by rotation of the drum. The "dry churn" is so termed because no aqueous solutions are introduced either before, during or after xanthation, thus maintaining the churn comparatively dry. In this method, carbon disulfide is introduced into the charged rotating churn and thereafter the rotation continued for a period of from one to three hours under controlled temperature conditions, usually between 20° C. and 35° C. Upon completion of xanthation, the crumbs, remaining in about their original moist state, are dropped and raked out of the churn into a dissolving vessel. Thereafter, a fresh charge of alkali cellulose crumbs is introduced into the churn and the process repeated in an identical manner from batch to batch.

Another method which has been proposed involves the employment of a so-called "wet xanthating churn." The expression "wet churn" is used because in the course of xanthating successive batches, and discharging of xanthated crumbs, aqueous solutions are introduced into the churn. In "wet churn" xanthating methods, as proposed heretofore, a batch of alkali cellulose crumbs, having about the same physical and chemical characteristics as the crumbs employed in the "dry-churn" methods, is charged into a stationary churn equipped with internal agitating means. After completing the normal steps of introducing carbon disulfide and after agitating until the xanthation reaction is complete, a predetermined quantity of water is introduced into the churn and the mass agitated to form a slurry of the xanthated crumbs. After the slurry has been discharged into a xanthate dissolver, a smaller quantity of aqueous caustic soda solution, containing all of the caustic required for the dissolving step, is introduced into the churn. In this method the caustic solution must necessarily have a causticity not less and preferably greater than that of the alkali cellulose crumbs, that is, about 15%, and preferably greater, i. e., 18%. Thereafter, such caustic wash solution is agitated within the churn, discharged and combined with the previously discharged slurry to form a viscose spinning solution of desired composition. Thereafter, another batch of alkali cellulose is charged into the churn while the churn is still wet with the final caustic wash solution of the previous batch.

As has been previously indicated, the methods heretofore proposed have avoided employing a final caustic churn wash solution having a causticity less than that of the alkali cellulose crumbs. This is due to a belief that any undrained, carry-over, caustic wash solution remaining in a churn might leach out the caustic from the succeeding batches of alkali cellulose and thus impair the reactivity of such batches with carbon bisulfide. Thus, in order to produce viscose of normal caustic composition, i. e., 5% to 8%, under such churn-wash limitations, it is essential that the volume of the final wash solution of each batch be much smaller than the volume of the preceding slurry solution. Under these conditions it has been found that the second and succeeding xanthate batches of a series of batches produce viscoses which contain excess amounts of unxanthated fibers and have poor filterability properties.

It is believed that the chief source of the difficulties arising out of the use of wet xanthating churns as heretofore proposed is the continual presence, in the churns, of undischarged viscose-like materials or viscose-containing particles and residues which are carried over from batch to batch. By viscose-like materials and viscose-containing materials is meant partially or wholly dissolved cellulose xanthates that are not in the same physical state as the final viscose spinning solution but are, nevertheless, quite similar chemically. These materials appear as fluid, semi-fluid or gummy compositions usually adhering to the exposed internal surface areas of the churns. It is quite probable that these materials are formed in the churn during either the slurry or the final wash step when the aqueous wash solutions contact residual xanthates adhering to the churn. Such material may also be formed during the xanthation step when the cellulose xanthate formed is exposed to aqueous caustic solutions remaining in the churn from the washing steps of the preceding batch. It is believed further that these viscose-containing residues when contacting freshly charged batches of alkali cellulose crumbs during the agitation and xanthation thereof impregnate and coat such alkali cellulose particles to such an extent that the carbon bisulfide cannot effectively contact and react with the alkali cellulose fibers. In any case, these viscose-like and viscose-containing materials are of a sticky and gummy nature tending to adhere to the exposed internal surface areas of the churns or to unxanthated alkali cellulose crumbs. Their economical removal and discharge from the churns at the completion of a batch have heretofore presented a difficult problem. Heretofore these materials have remained in the churns in amounts sufficient to impair the quality of the viscose and the efficiency of its production.

Due to such conditions, a number of difficulties may appear, namely, progressive accumulation of gummy, viscose-like, fibrous residues which adhere to the internal surface areas of the churn; low xanthation efficiency; poor dissolution of the cellulose xanthate; viscose filtration difficulties; loss of raw materials due to the wastage of non-filterable products; progressive lowering of viscose quality with each bath; time-consuming interruptions to clean the churns between batches; and nonuniformity of the batches of viscose produced.

Now, in accordance with the present invention, it has been found that the above-mentioned difficulties in the production of viscose by the "wet churn" method may be minimized and a viscose of consistently desirable quality and filterability can be produced with a minimum of between-batch interruptions, and with lower production costs. It has been found that the causticity of a final churn-washing solution employed to wash out the undischarged portions of a batch of xanthated cellulose need not be either at or above the causticity of the alkali cellulose employed. Hereinafter, such final churn-washing solution will also be referred to as a churn-scavenging solution. It has been found further that production of viscose will be improved if a final washing or churn-scavenging solution is employed which has a volume not less and preferably greater than the first introduced slurry solution irrespective of the caustic content of such scavenging-wash solution. Advantageously, however, some amount of caustic should be present in both the slurry solution and the succeeding churn-scavenging solution, the latter having a caustic content substantially less than that of the alkali cellulose and a total volume substantially greater than the slurry solution. Thus, among the advantages flowing from this invention is the availability of an economically efficient and thoroughly effective, between-batch churn-cleaning and washing operation in which the internal walls of a "wet churn" can be rendered substantially free of adherent residues.

The new process of this invention may be practiced generally as follows: A batch of alkali cellulose is charged into a churn and treated with carbon bisulfide to form cellulose xanthate. A quantity of aqueous caustic soda solution is introduced into the churn and mixed with the cellulose xanthate and the resulting mixture then discharged from the churn. Thereafter, the churn is scavenged with an aqueous solution having a volume not less than the aqueous caustic first mixed with the cellulose xanthate and having a causticity of either zero or merely less than the causticity of the alkali cellulose. The scavenging solution is then discharged from the churn and combined with the mixture first discharged from the churn, the volumes and causticities of the respective aqueous wash solutions introduced into the churn being such that the combined discharges from the churn produce a viscose having the desired composition. Thereafter, a new batch of alkali cellulose is charged into the churn and the cycle repeated. The following is an example of the process of the invention.

*Example 1*

A 900 gallon xanthating churn (Baker-Perkins Company's "Wet Churn") equipped with rotating agitation blades was used which had its internal surface areas wetted with incompletely drained scavenging solution remaining from a previous batch, such solution having the same concentration and being the same as the scavenging solution described below. The churn was charged with a 1300 pound batch of alkali cellulose crumbs, analyzing, by weight, approximately 32% cellulose, 15% NaOH and 53% water. After evacuating the vessel of air to about 24 inches of mercury and while agitating the crumbs at 13 R. P. M., approximately 150 pounds of carbon disulfide was introduced into the churn. The temperature of the reaction mass in the churn at the start of the reaction was about 25° C. and by means of a cooling jacket on the churn this temperature was not permitted to rise above about 30° C. After about one and one-half hours of agitation under such conditions, agitation was stopped and a charge of about 1950 pounds of 4% aqueous caustic soda solution at a temperature of about 20° C. was introduced into the churn. The mass was then agitated for five minutes at an increased R. P. M. of about 25 and the slurry thus formed was discharged into a dissolver. After closing the discharge opening of the churn, another charge of 1950 pounds of 4.0% aqueous caustic soda solution at a temperature of about 20° C. was introduced into the churn and agitated at 25 R. P. M. for about 30 minutes to scavenge and clean the internal surface areas of the churn. This scavenging solution was then discharged into the dissolver containing the previous slurry and the churn was permitted to drain for five minutes. The combined slurry and scavenging wash produced a batch of viscose spinning solution having a caustic soda content of about 6.5%. Thereafter, another similar batch of alkali cellulose was introduced into the churn and the steps of xanthating, slurrying out and churn-scavenging were repeated under identical conditions. The viscose produced in accordance with this example was substantially free from gels and fibers, had improved filterability properties and was of superior and more uniform quality than when smaller volumes of churn scavenging solution are employed having sodium hydroxide contents greater than that of the alkali cellulose.

I claim:

1. In the process of forming a viscose solution in which process a quantity of alkali cellulose having an alkalinity of the order of about 15% NaOH by weight is introduced into a churn and treated with carbon disulfide to form sodium cellulose xanthate and in which an aqueous caustic soda solution is thereafter admixed with said formed cellulose xanthate and the mixture discharged into a dissolving vessel to form a viscose solution the steps comprising; scavenging said discharged churn at least once with an aqueous caustic soda solution having an alkalinity less than that of said alkali cellulose; discharging said scavenging solution from said churn; combining in a dissolving vessel substantially all of said discharged scavenging solution with said previously discharged mixture to form a viscose solution having an alkalinity between about 5% and 8% NaOH by weight; thereafter introducing another quantity of alkali cellulose into said churn while said churn is still wet with scavenging solution; and repeating the cycle.

2. In the process of forming a viscose solution in which process a quantity of alkali cellulose having an alkalinity of the order of about 15% NaOH by weight is introduced into a churn and treated with carbon disulfide to form sodium cellulose xanthate and in which an aqueous caustic soda solution is thereafter admixed with said formed cellulose xanthate and the mixture discharged into a dissolving vessel to form a viscose solution the steps comprising; scavenging said discharged churn at least once with an aqueous caustic soda solution having an alkalinity less than that of the viscose ultimately produced; discharging said scavenging solution from said churn; combining in a dissolving vessel substantially all of said discharged scavenging solution with said previously discharged mixture to form a viscose solution having an alkalinity between about 5% and 8% NaOH by weight; thereafter introducing another quantity of alkali cellulose into said churn while said churn is still wet with scavenging solution; and repeating the cycle.

3. In the process of forming a viscose solution in which process a quantity of alkali cellulose having an alkalinity of the order of about 15% NaOH by weight is introduced into a churn and treated with carbon disulfide to form sodium cellulose xanthate and in which an aqueous caustic soda solution is thereafter admixed with said formed cellulose xanthate and the mixture discharged into a dissolving vessel to form a viscose solution the steps comprising; scavenging said discharged churn at least once with an aqueous caustic soda solution, both said previously admixed aqueous caustic solution and said scavenging solution having alkalinities less than that of the viscose ultimately produced; discharging said scavenging solution from said churn; combining in a dissolving vessel substantially all of said discharged scavenging solution with said previously discharged mixture to form a viscose solution having an alkalinity between about 5% and 8% NaOH by weight; thereafter introducing another quantity of alkali cellulose into said churn while said churn is still wet with said scavenging solution; and repeating the cycle.

4. In the process of forming a viscose solution in which process a quantity of alkali cellulose having an alkalinity of the order of about 15% NaOH by weight is introduced into a churn and treated with carbon disulfide to form sodium cellulose xanthate and in which an aqueous caustic soda solution is thereafter admixed with said formed cellulose xanthate and the mixture discharged into a dissolving vessel to form a viscose solution the steps comprising; scavenging said discharged churn a plurality of times with aqueous caustic soda solutions having alkalinities less than that of said alkali cellulose; discharging said scavenging solutions from said churn; combining in a dissolving vessel substantially all of said discharged scavenging solutions with said previously discharged mixture to form a viscose solution having an alkalinity between about 5% and 8% NaOH by weight; thereafter introducing another quantity of alkali cellulose into said churn while said churn is still wet with scavenging solution; and repeating the cycle.

5. A process according to claim 1 in which water is introduced into the discharged churn as a scavenging solution.

6. In the process of forming a viscose solution in which process a quantity of alkali cellulose having an alkalinity of the order of about 15% NaOH by weight is introduced into a churn and treated with carbon disulfide to form sodium cellulose xanthate and in which an aqueous caustic soda solution is thereafter admixed with said formed cellulose xanthate and the mixture discharged into a dissolving vessel to form a viscose solution the steps comprising; scavenging said discharged churn a plurality of times with an aqueous caustic soda solution and agitating said scavenging solutions in said churn; both said previously admixed aqueous caustic solution and said plurality of scavenging solutions having alkalinities less than that of the viscose solution ultimately produced; discharging said scavenging solutions from said churn; combining in a dissolving vessel substantially all of said discharged scavenging solutions with said previously discharged mixture to form a viscose solution having an alkalinity between about 5% and 8% NaOH by weight; thereafter introducing another quantity of alkali cellulose into said churn while said churn is still wet with scavenging solution; and repeating the cycle.

EMIL KLINE.

REFERENCES CITED

The following references are of record in the file of this patent:

UNITED STATES PATENTS

| Number | Name | Date |
|---|---|---|
| 1,807,370 | Bernard | May 26, 1931 |
| 2,338,196 | Nash | Jan. 4, 1944 |

FOREIGN PATENTS

| Number | Country | Date |
|---|---|---|
| 456,841 | Great Britain | Nov. 16, 1936 |

OTHER REFERENCES

Vollrath Rayon Textile Monthly, page 49, July 1936.